United States Patent [19]

Helmsderfer

[11] Patent Number: 5,678,598
[45] Date of Patent: Oct. 21, 1997

[54] COVER ASSEMBLY AND METHOD FOR COVERING UNDERSINK PIPING

[76] Inventor: John A. Helmsderfer, 1033 Windsor Ct., Cincinnati, Ohio 45206

[21] Appl. No.: 675,782

[22] Filed: Jul. 5, 1996

Related U.S. Application Data

[60] Division of Ser. No. 271,439, Jul. 7, 1994, Pat. No. 5,586,568, which is a continuation-in-part of Ser. No. 146,999, Oct. 29, 1993, Pat. No. 5,341,830.

[51] Int. Cl.$^6$ ........................... F16L 7/00
[52] U.S. Cl. .............. 137/375; 137/247.51; 285/47; 138/178
[58] Field of Search ............ 137/247.49, 247.51, 137/375; 285/47; 138/178

[56] References Cited

U.S. PATENT DOCUMENTS

| | | | |
|---|---|---|---|
| 411,115 | 9/1889 | Wendell | 138/159 |
| 2,140,308 | 12/1938 | Belshaw | 285/47 X |
| 2,650,180 | 8/1953 | Walker | 137/375 |
| 2,761,949 | 9/1956 | Colton | 285/47 X |
| 2,841,203 | 7/1958 | Gronemeyer | 138/160 X |
| 2,937,662 | 5/1960 | Green | 285/47 |
| 3,014,827 | 12/1961 | Clinchy et al. | 138/161 |
| 3,153,546 | 10/1964 | Dunn | 285/47 X |
| 3,402,731 | 9/1968 | Martin | 137/375 |
| 3,559,694 | 2/1971 | Volberg | 285/47 X |
| 3,598,157 | 8/1971 | Farr et al. | 138/157 |
| 3,790,418 | 2/1974 | Huvey et al. | 137/375 X |
| 3,801,140 | 4/1974 | Keller | 285/47 |
| 3,960,181 | 6/1976 | Baur et al. | 138/178 |
| 4,463,780 | 8/1984 | Schultz et al. | 138/178 |
| 4,473,244 | 9/1984 | Hill | 137/375 X |
| 4,516,278 | 5/1985 | Lamond | 4/679 |
| 4,594,740 | 6/1986 | Tseronakis | 137/247.51 X |
| 4,595,615 | 6/1986 | Cohen | 138/155 X |
| 4,667,505 | 5/1987 | Sharp | 138/161 X |
| 4,669,509 | 6/1987 | Botsolas | 138/178 |
| 4,705,302 | 11/1987 | Beiley | 285/47 |
| 4,746,147 | 5/1988 | Walker | 285/47 X |
| 4,804,210 | 2/1989 | Hancock | 285/47 |
| 4,840,201 | 6/1989 | Bostolas | 138/178 |
| 5,002,716 | 3/1991 | Van Dijck | 285/47 X |
| 5,054,513 | 10/1991 | Treub et al. | 137/375 |
| 5,055,334 | 10/1991 | Lechuga | 137/375 X |
| 5,163,469 | 11/1992 | Treub et al. | 137/375 |
| 5,183,299 | 2/1993 | Hallerstrom et al. | 285/47 |
| 5,259,410 | 11/1993 | Treub et al. | 137/375 |
| 5,303,730 | 4/1994 | Treub et al. | 137/375 |
| 5,341,830 | 8/1994 | Helmsderfer | 137/15 |
| 5,360,031 | 11/1994 | Treub et al. | 137/375 |
| 5,419,364 | 5/1995 | Treub et al. | 137/375 |
| 5,454,392 | 10/1995 | Treub et al. | 137/375 |

FOREIGN PATENT DOCUMENTS

| | | | |
|---|---|---|---|
| 1249974 | 2/1989 | Canada. | |
| 2714576 | 10/1978 | Germany | 137/375 |
| 4201 | of 1899 | United Kingdom | 138/158 |

*Primary Examiner*—John Rivell
*Attorney, Agent, or Firm*—Wood, Herron & Evans, LLP

[57] ABSTRACT

A cover assembly and methods for covering undersink piping includes insulative cover pieces placed over respective pipe sections such that their ends are adjacent at pipe junctures. Collars are slidable over or inside the cover pieces to be moved to cover the junctures. An alternative cover structure may be wrapped around the pipe juncture to form a generally continuous insulative cover, or alternatively, the fastening structures are insulated such that when the pipe sections are assembled together, the cover pieces and insulating fastening structures form a continuous insulative cover. In an alternative embodiment, one of the cover pieces is dimensioned to slide upwardly and downwardly on a pipe section and a collar structure is placed over the exposed pipe section to provide a continuous cover piece. In another alternative embodiment, pipe sections such as a trap pipe or offset grid drain are insulated by a unique insulative method to produce a generally continuous insulative cover layer on the pipe section which is free of slits or openings to prevent contaminants and bacteria from accumulating on the pipe. A still further embodiment utilizes a cover piece for a trap pipe which includes a projection and closure structure for covering the drain opening of the trap pipe but allowing access to the drain opening without requiring removal of the cover piece or disassembly of the P-trap piping assembly.

6 Claims, 7 Drawing Sheets

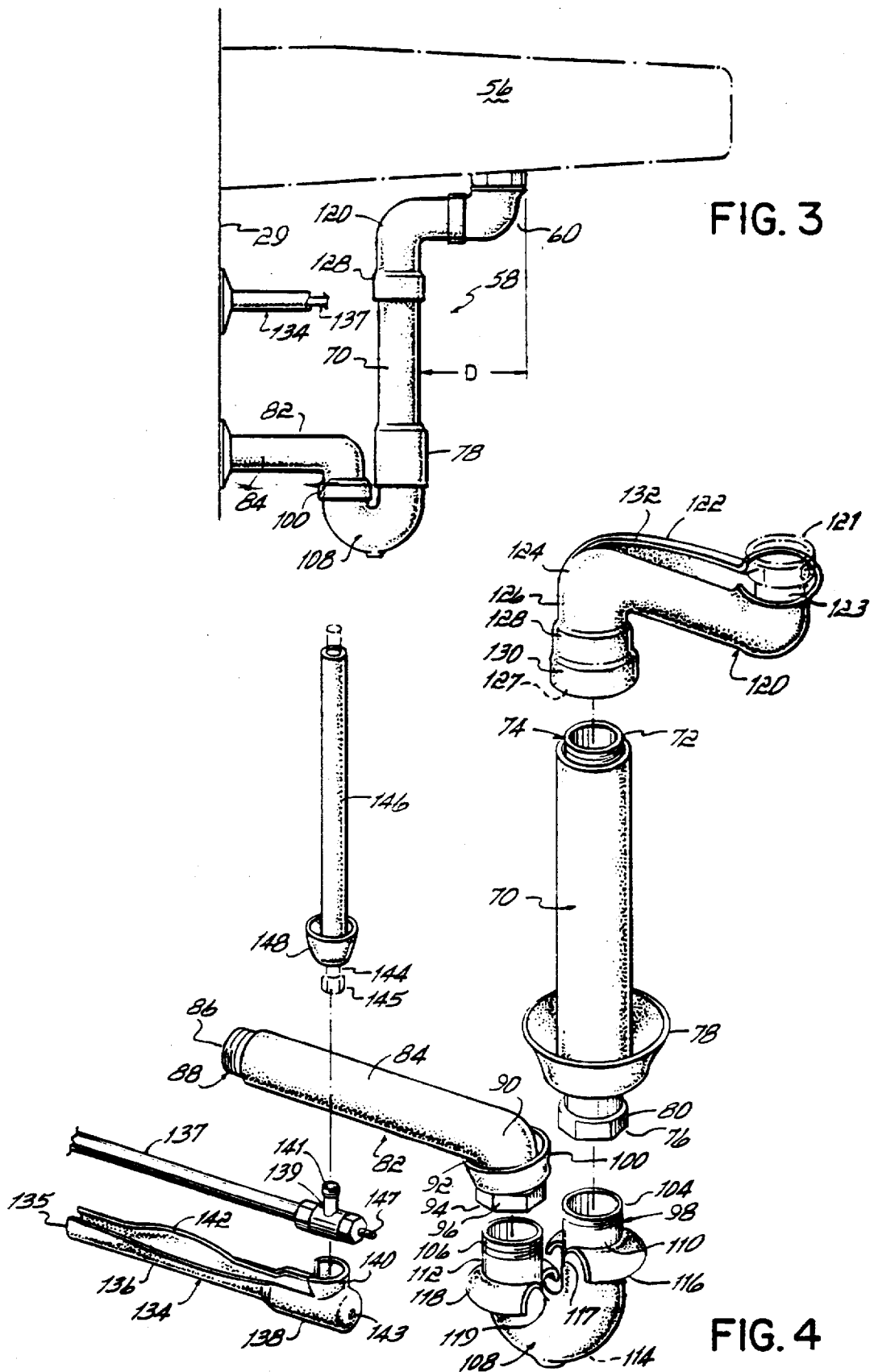

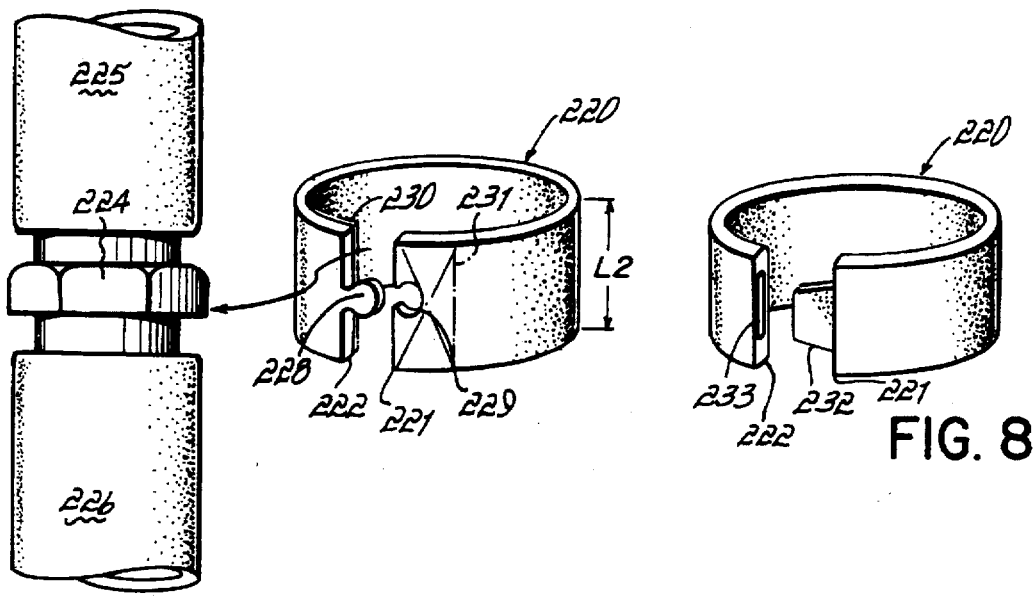
FIG. 8A
FIG. 8B
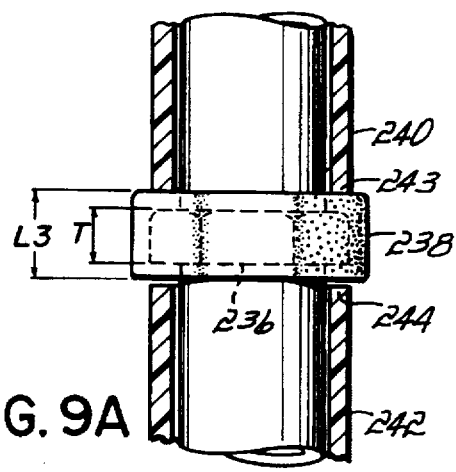
FIG. 9B
FIG. 9A
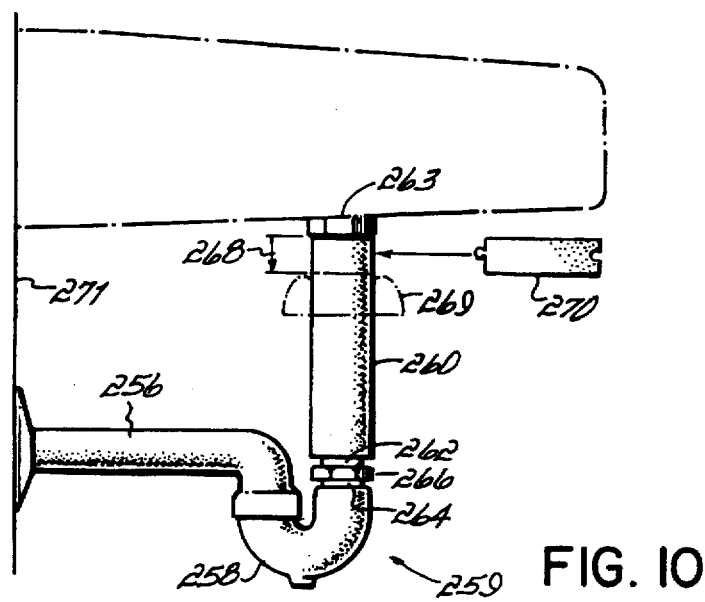
FIG. 10

COVER ASSEMBLY AND METHOD FOR COVERING UNDERSINK PIPING

RELATED APPLICATIONS

This application is a divisional of application Ser. No. 08/271,439 filed on Jul. 7, 1994, now U.S. Pat. No. 5,586,668, entitled COVER ASSEMBLY AND METHOD FOR COVERING UNDERSINK PIPING, which is a continuation in part of application Ser. No. 08/146,999 now U.S. Pat. No. 5,341,830, entitled "Cover Assembly and Method For Covering Undersink Piping" filed Oct. 29, 1993 which applications are completely incorporated herein by reference in their entireties.

FIELD OF THE INVENTION

This invention relates generally to undersink piping such as P-trap drains and water supply piping, and specifically discloses apparatus and methods to cover the undersink piping so as to insulate the piping and to protect a person from abrasions and burns caused by contact with the piping.

BACKGROUND OF THE INVENTION

Conventionally, water which drains from a sink or basin, such as a restroom sink, travels through the drain opening of the sink and empties into undersink piping which directs the water from the sink into the building's waste water system. The undersink drain piping is referred to as a "P-trap" drain, and "P-trap" assemblies are common to many sinks, both commercial and residential. The P-trap piping assembly includes vertical pipe section which extends downwardly from the sink drain opening and below the sink to a J-shaped pipe section. The J-shaped pipe section makes a 180° bend and then extends vertically upward to connect to an L-shaped pipe piece which makes a 90° bend from the J-shaped piece to extend generally horizontally into the wall to connect the P-trap with the waste water system of the building. The J-shaped portion serves the purpose of capturing or trapping any foreign objects which fall down the drain and which may become lodged in the waste water drainage system therefore clogging the system, hence the name "P-trap". Under the force of gravity, any foreign objects will sit in the bottom of the J-shaped section to be subsequently removed, such as by a plumber. Also extending below sinks are hot and cold water supply pipes commonly referred to as supply water angle valves, which include supply line sections connected to a water supply that extend generally horizontally from the wall to connect to a valve and faucet line sections that extend generally vertically upward from the valve to connect to the sink faucet.

Current building regulations require that restroom facilities in a public building, such as restroom sinks, be accessible to all people, including disabled persons. Disabled persons, such as persons in wheelchairs, must often maneuver the chair partially under the sink to access it. Since the water supply pipes and P-trap drain pipes protrude from the wall there is a risk of abrasions from the hard piping or even burns from the temperature of the water and piping to the legs of a person confined to a wheelchair. The current federal and state regulations regarding undersink piping, most notably the Americans With Disabilities Act (ADA), require that the P-trap and water supply piping be covered and insulated so as to protect a person using the sink from being burned or from incurring injuries from impact with the piping. As a result of these regulations, various methods and apparatuses have been utilized to try and adequately cover and insulate undersink P-traps and water supply piping. In the past, one of the more popular methods of insulation was to utilize loose foam insulation which was wrapped around the piping. However, traditional foam insulation usually fit poorly and was difficult to secure resulting in wasted time and frustration by the plumber or other installer. Furthermore, the foam wrap, due to its poor fit and inadequate securing means, was not very aesthetically pleasing in its appearance. Additionally, the ribbed construction of a wrapped pipe leaves ridges and cavities which trap dirt and other bacteria under the sink.

Various other methods and apparatuses have been utilized to cover a P-trap and supply piping beneath a sink as is evidenced by various patents in the field. However, besides often being ineffective, many of these other devices and methods are still difficult and time consuming to secure and use, requiring various fasteners and other securing means to hold the insulation and coverings to the piping. For example, various existing undersink pipe coverings utilize lengthwise slits on all of the different cover pieces to fit them over the piping, which requires external fasteners to clamp the slit pieces together circumferentially. Further, existing coverings include various ridges, slits and/or openings on the cover piece which have a tendency to trap dirt and other bacteria around the coverings and pipes. Such openings and slits may be inappropriate for use in sterile environments such as hospitals where trapped bacteria may lead to infection of persons using the facilities.

Still further, some of the various currently available cover devices do not present a pleasant appearance when installed, and do not wear well having a tendency to spread at various slits and openings.

Accordingly, there is still a need for a simple and sanitary P-trap and supply pipe cover assembly and method which addresses the shortcoming of the existing devices and methods. It is therefore an object of the present invention to provide such a cover assembly and method which addresses the shortcomings of prior devices and is still effective to prevent a disabled person from being burned or bruised and cut by the piping when using a sink.

SUMMARY OF THE INVENTION

The present invention accomplishes the desired results as discussed hereinabove by presenting an improved cover assembly for the P-trap drainage and supply pipes located under a sink which is relatively inexpensive and simple to manufacture, simple to install in a very short time requiring little or no external fasteners, adequately secured to the piping when installed and effective to prevent abrasions and burns, and aesthetically pleasing in appearance with a smooth, outer surface having minimal cavities or openings that might trap dirt and other bacteria. More specifically, the invention comprises a novel assembly of separate pipe-covering pieces which are configured to fit over the various pipe sections of undersink P-trap drains and over the junctures and fastening structures between the pipe sections. The pieces of the invention cooperate one with the other in a unique and novel way to adequately cover and insulate the associated piping.

To that end, one embodiment of the present invention includes a P-trap cover assembly comprising a generally straight insulative piece which is configured to cover the generally straight pipe section extending downwardly from the sink drain opening to the J-shaped pipe section of a P-trap. A second insulative piece is generally J-shaped having two ends and is configured to cover the J-shaped trap pipe section of the P-trap. A third piece is generally L-shaped and configured to cover the L-shaped pipe section which extends from one end of the J-shaped pipe section back to the wall of the building to connect the drain to waste water or sewerage lines. When the cover pieces of the invention are installed on the respective pipe sections of conventional P-trap drain piping, the adjacent ends of the straight and J-shaped pieces are positioned proximate a forward pipe juncture while an end of the L-shaped piece and the other end of the J-shaped cover piece are adjacent one another and are positioned proximate a rearward juncture. The junctures are left exposed so that the pipe sections may be secured together at the junctures by a plumber or other installer using the securing mechanisms, such as conventional pipe nuts. Slidable collar structures are positioned proximate to each of the junctures.

Each slidable collar structure slides along a portion of one of the pipe sections and slides with respect to an insulative cover piece which covers the pipe section. Each collar structure is operable to be slid away from the pipe juncture so that the pipe sections may be joined together and is further operable to be slid over the juncture to form, with the cover pieces, a generally continuous insulative cover over the joined pipe sections. One embodiment of the slidable collar structure has a diameter larger than one of the adjacent cover pieces so that it may be slid over that cover piece toward and away from the juncture. Preferably, the slidable collar is dimensioned in length to cover the entire pipe juncture between the adjacent cover pieces, although a small portion of the juncture may be exposed without affecting the effectiveness of the invention. In another embodiment, the collar structure is dimensioned in diameter to be partially slidable inside a portion of one of the cover pieces between the cover piece and the respective pipe section. The collar structure is slid the cover piece and away from the juncture when the pipe sections are being joined together, and is then slid over the juncture to form a generally continuous insulative cover in accordance with the present invention. An alternative version of the slidable collar structure utilizes two collar pieces which slide over or inside the cover pieces and extend over the juncture and overlap or abut to form the collar structure. Preferably, collar structures cover both the forward and rearward pipe junctions to create a continuous insulative cover over the entire undersink piping assembly.

The slidable collar structures allow quick and easy assembly and use of the invention by exposing the pipe junctures and the pipe nuts for further manipulation in completing the P-trap drain assembly even after the insulative cover pieces have been placed on the pipes. Since the slidable collar structures are slid back to expose the junctures while the cover pieces are in position on the pipe sections, the cover pieces do not have to be forced or moved in various directions to assemble the pipe sections. Nor do the pipe sections have to first be assembled into a complete P-trap and the insulative cover pieces subsequently placed thereon as is necessary with many of the current devices. This amounts to a substantial savings in time when applying the invention and assembling a P-trap drain. Furthermore, since the collars allow the individual cover pieces of the invention to be applied to the respective pipe sections prior to assembly of the P-trap, the cover pieces require little or no additional securement to the pipe sections after installation. For example, in one embodiment of the invention, the L-shaped and straight cover pieces are essentially whole, tubular pieces which, because of the slidable collars, may be placed over the respective pipe sections prior to assembly of the P-trap. Once installed with the collar structures slid down, the cover pieces completely cover their respective pipe sections and are secure thereon without need for additional securing mechanisms.

In an alternative embodiment of the present invention, the collar structure has opposing ends and is operable to be wrapped around the pipe juncture and fastened at its opposing ends to form a continuous collar structure around the juncture after the pipes have been fastened together. The various collars may be formed of a flexible material to be folded back to allow access to the junctures after they have been installed.

In a still further alternative embodiment, the present invention utilizes an insulated pipe nut or other insulated fastening structure. The individual insulative cover pieces are placed on their respective pipe sections and the pipes are then joined at the juncture utilizing the insulated pipe nut. The insulated pipe nut attaches the pipe sections together and forms a generally continuous insulative cover over the pipe sections at the juncture. In one version, the insulative nut includes an extension section of insulative material which is dimensioned to either abut with, overlap or slide within the end of the cover piece.

In another alternative embodiment of the present invention, one of the cover pieces, such as the generally straight insulative cover piece, is dimensioned shorter than the respective pipe section which it insulates. The cover piece may then be slid upwardly toward the drain opening to expose the juncture so that the pipe sections may be joined together. The cover piece is then operable to be slid downwardly such that the corner piece covers and insulates the juncture and exposes a portion of the pipe section proximate the drain from which the pipe section extends. A collar structure, such as a slidable, wrappable, or flexible collar as previously discussed, is placed over the exposed pipe portion to form a generally continuous insulative cover from the sink drain to the wall. In one version, stop projections are included on the generally straight cover piece or the J-shaped cover piece proximate the juncture. The stop projections preferably extend inwardly of the cover piece such that the projections abut against the pipe nut at the juncture or against the end of the adjacent cover piece to prevent the further movement of one cover piece, such as the generally straight piece, with respect to an adjacent cover piece, such as the J-shaped piece. The stop projections seat the two cover pieces together.

The outside surfaces of the cover pieces and the collar and insulated nut structures are preferably smooth such that when the invention is completely assembled over a P-trap, it is aesthetically pleasing in appearance giving the impression of a single, continuous cover. The invention has minimal cavities or openings in the smooth exposed outer surface, therefore reducing the possibility that dirt or other bacteria might be trapped in and around the cover and P-trap.

A further embodiment of the invention utilizes a J-shaped cover piece for covering a trapped pipe section which includes a drain opening sealed with a closure plug. The J-shaped cover piece includes first and second straight portions joined by a curved portion and a hollow projection preferably extending from the outermost point of the curved portion to surround and cover the drain opening and closure plug. The projection defines an opening which is closable by a cap, cover plug, or hinged flap, for example, which may be removed to allow access to the drain opening and closure plug through the projection. Another embodiment of the cover includes a recessed cavity to allow access to the drain opening. This allows access to the drain opening of the P-trap without removing the entire insulative cover from the drain piping assembly.

As the invention is used to comply with various federal and state regulations regarding the coverage of undersink piping which is accessible to disabled persons, it is quite possible that a person using the invention will encounter a P-trap piping assembly under a sink containing an offset grid drain. An offset grid drain fits between a sink drain and a conventional P-trap and is utilized under sinks specifically designed for persons with disabilities to move the P-trap piping assembly rearwardly away from the from of the sink and toward the wall thus allowing greater space under the sink.

In a further embodiment of the present invention, drain pipe sections such as a J-shaped trap section and an offset grid drain are covered by a unique insulating process to produce an insulative cover piece on the pipe section which is free of a slit along the substantial portion of its length to provide a generally continuous cover which completely covers the trap pipe and prevents dirt and contaminants from being trapped on the cover piece and trap pipe. Preferably, the cover piece is completely free from any slits or openings along its length to provide complete coverage of the pipe section and to more effectively prevent dirt and contaminants from accumulating in such slits or openings. The method includes heating the pipe sections and sealing its ends. Various of the pipe sections include threaded ends, and the sections are sealed such that the threaded ends are protected and are not exposed. A layer of liquified insulation materials is then applied to the heated pipe section and the material layer is cured until it hardens to form an insulative layer. The ends are then unsealed such that the insulated pipe section may be readily installed beneath a sink. The process yields undersink pipe sections covered generally completely with an insulative layer which are ready for installation such as by using a collar structure as discussed above. The unsealed pipe ends leave the threads free from insulative material which allows proper fastening of the pipe sections together at juncture and then subsequent covering of the juncture with a collar structure.

As a result, the present invention provides cover assemblies which are relatively inexpensive and simple to manufacture. Furthermore, the cover assemblies are simple to install in a very short time requiring little or no external fasteners and no special tools. The cover assemblies adequately cover the exposed undersink piping and are effective to prevent abrasions and burns, particularly with persons in a wheelchair who may find their legs beneath the sink. The cover assemblies of the present invention are aesthetically pleasing when installed having a smooth, outer surface with minimal cavities or other openings that might trap or accumulate dirt and other bacteria under the sink. One embodiment of the present invention provides a continuous insulative cover with no openings or slits which is suitable for use in hospitals and other sterile environments where bacteria and dirt are a significant concern. Further advantages of the present invention will become apparent from the detailed description of the invention given below.

BRIEF DESCRIPTION OF THE DRAWINGS

FIG. 3 is a side view of a sink assembly with the undersink piping including an offset grid drain covered by the present invention;

FIG. 4 is a disassembled perspective view of the present invention installed around various pipe sections;

FIGS. 8A and 8B are perspective views, in partial section, of an alternative embodiment of the present invention utilizing a wrappable collar structure;

FIGS. 9A and 9B are side views, in partial section, of an alternative embodiment of the present invention utilizing insulated fastening structures;

FIG. 10 is a side view of a sink assembly with piping covered by an alternative embodiment of the insulative cover of the present invention utilizing a collar structure to cover an exposed pipe section;

DETAILED DESCRIPTION OF THE DRAWINGS

Figure 1:
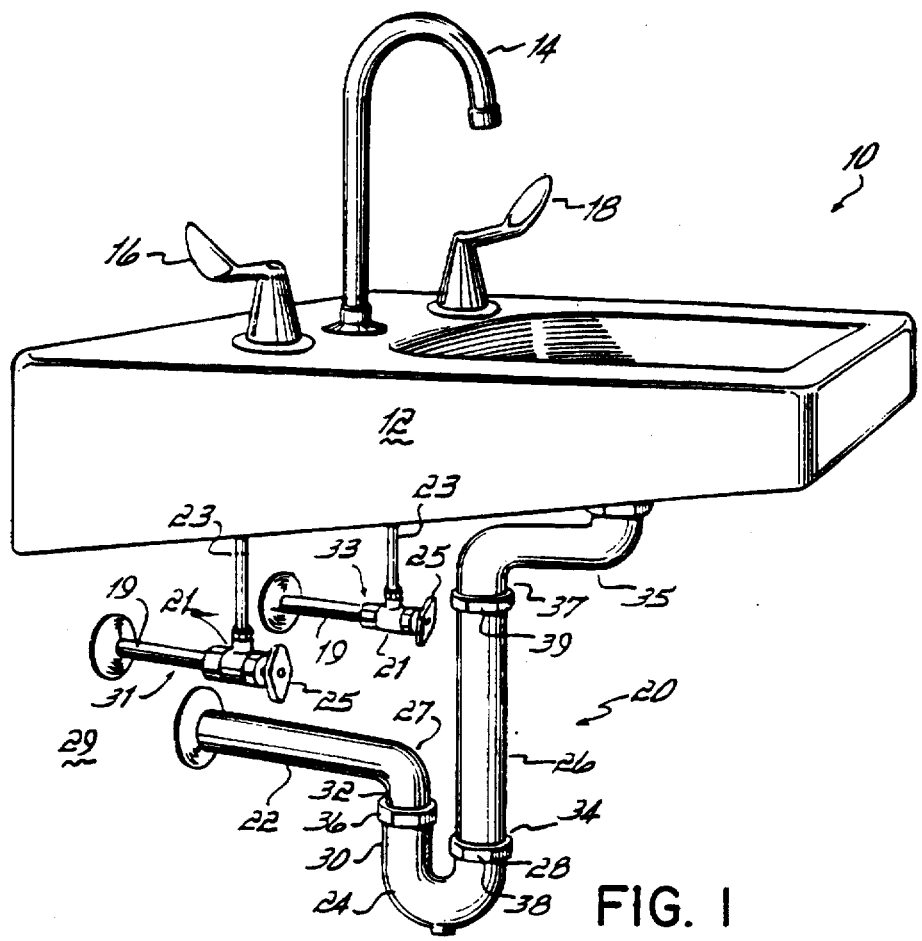
FIG. 1 is a front perspective view of a sink and piping assembly on which the present invention is used.

FIG. 1 shows a conventional sink assembly 10 which might be utilized in public facilities and which, therefore, must comply with various federal, state and local ordinances regarding accessibility by disabled persons and covering of undersink piping, notably the Americans With Disabilities Act (ADA). Assembly 10 shows a sink basin 12, a faucet spout 14, and faucet valve handles 16 and 18 for directing hot and cold water, respectively, through faucet spout 14 and into basin 12. Beneath the sink are located various pipe assemblies for supplying water to the faucet 14 and draining water from the sink basin 12. Specifically, a traditional P-trap pipe assembly 20 is shown comprising an L-shaped pipe section 22, a 180° bend pipe on or J-shaped pipe section 24 and a straight pipe section 26. The straight pipe on 26 extends downwardly from a sink basin drain opening (not shown) carrying waste water from the sink basin 12 to the J-shaped trap section 24. The straight section 26 connects with a vertical front portion 28 of the J-shaped trap section 24. Water flowing through the J-shaped section 24 travels up the vertical rear portion 30 of J-shaped section 24 and into L-shaped section 22 which is connected to the waste water system (not shown) within the internal plumbing of the structure behind wall 29. The J-shaped trap section 24 traps solid objects which may have fallen down the drain opening. While the straight section 26 extends generally vertically, the transitional curve 27 of the L-shaped section 22 orients that section to extend generally horizontally with respect to a floor surface.

The conventional P-trap pipe assembly 20 in FIG. 1 is shown connected to an offset grid drain 35 which is often used with handicap accessible sinks. The offset grid drain 35 connects between the sink drain and the straight pipe section 26 of the P-trap. The drain 35 extends rearwardly from the front of basin 12 to effectively move the P-trap piping assembly 20 rearwardly away from the front of sink and out of the way of a person in a wheelchair.

Hot and cold water are supplied to faucet 14 by way of the hot and cold water supply pipe and valve assemblies, or water angle valves as they are commonly known, 31 and 33, as will be described further hereinbelow.

The various piping sections 22, 24, 26 and 35 are connected together at junctures 32, 34, and 37 utilizing fastening structures such as conventional pipe fastening nuts 36, 38, and 39. For example, nut 38 secured to straight section 26 might be screwed onto a threaded end of the J-shaped section 24 until sections 26 and 24 are held together at juncture 32 in a watertight seal (See FIG. 4). Alternatively other securing structures or methods might be used as will be recognized by a person of ordinary skill in the art. Sections 22 and 24 might be similarly fastened together using nut 36 over a threaded end on the rear portion 30 of J-shaped section 24 and sections 26 and 35 secured together in a like manner using nut 39. Alternatively, an offset grid drain 35 might not be used and the P-trap drain assembly would then be directly connected to the drain opening (not shown) of basin 12 (See FIG. 2).

Figure 2:
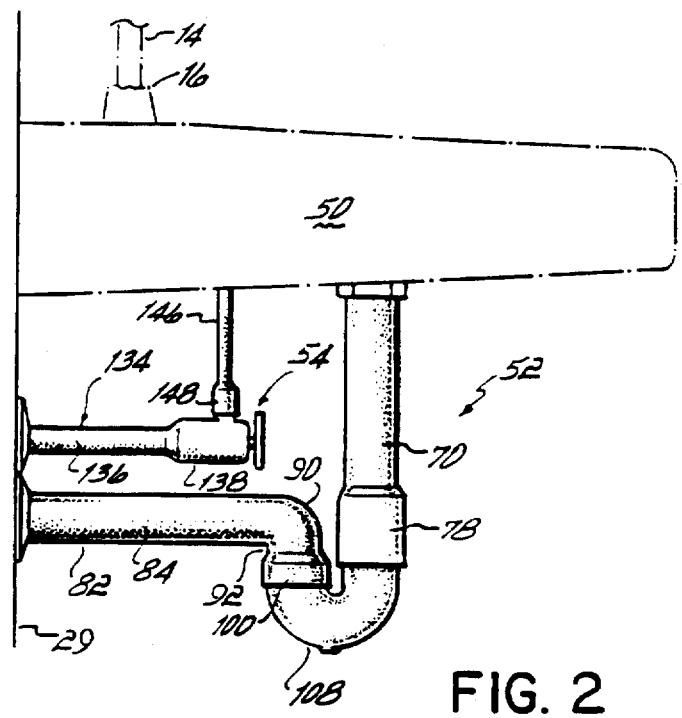
FIG. 2 is a side perspective view of a sink assembly with the undersink piping covered by the present invention.

FIGS. 2 and 3 show an embodiment of the cover of the present invention in use on various undersink water supply and P-trap drain assemblies. Specifically, FIG. 2 shows a sink basin 50 having a conventional P-trap drain 52 and water supply angle valves 54. FIG. 3, on the other hand, shows a basin 56 which is connected to a conventional P-trap drain 58 through an offset grid drain 60. As shown in FIG. 3, the offset grid drain 60 moves the P-trap 58 rearwardly a horizontal distance D from the front of the basin 56 as opposed to FIG. 2 where only a P-trap drain 52 is used without an offset grid drain.

Figure 4A:
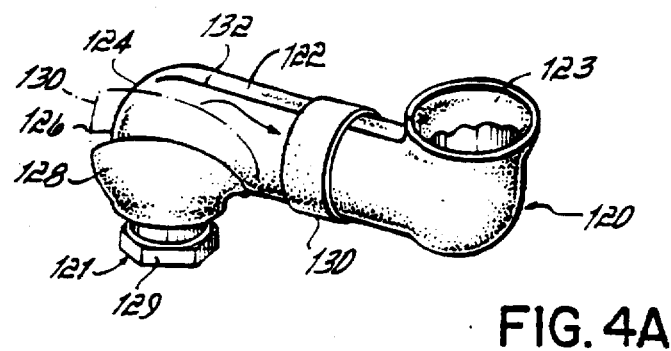
FIG. 4A is a perspective view of a cover of the present invention shown around an offset grid drain.
Figure 5:
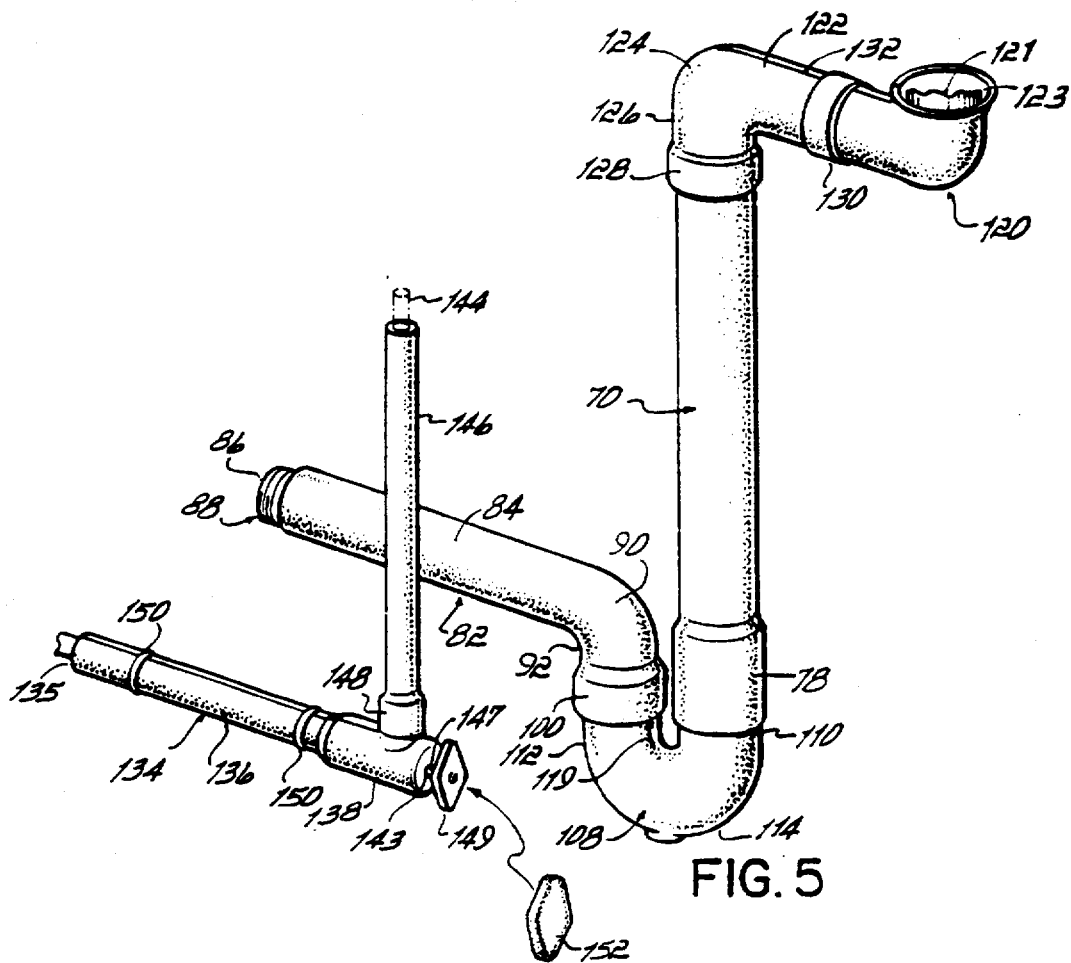
FIG. 5 is a front perspective view of the complete invention around the assembled drain and water supply piping.

FIGS. 2, 3, 4, 4a, and 5 show views of several embodiments of the present invention installed over the various P-trap and water supply pipe sections of an undersink piping assembly. One embodiment of the cover of the present invention includes a straight piece 70 which is configured to have an elongated cylindrical tubular body to cover the straight pipe section of the P-trap. Cover piece 70 extends from proximate the upper end 72 of pipe 74 and approximately the entire length of pipe 74 to proximate lower end 76 of pipe 74. It should be understood that pipe section 74 extending down from a sink drain may deviate from being perfectly straight, and cover piece 70 may be configured to cover such a pipe without deviating from the scope of the present invention. Integral with the cover piece 70 at the lower end thereof is an integral, flexible collar 78. Flexible collar 78 is preferably of a larger diameter than the rest of cover piece 70 and is bendable and configured to be folded upwardly and back along the length of cover piece 70 as shown in FIG. 4 when cover piece 70 is placed over pipe section 74. The cover piece 70 is whole and unslit along its length and is slid over pipe section 74. As such, cover piece 70 generally provides complete coverage of pipe section 74. When installation of the cover pieces and assembly of the P-trap is complete, collar 78 is folded down over pipe nut 80 as will be described hereinbelow in greater detail and as is shown in FIG. 5.

The cover of the invention further includes an L-shaped cover piece 82 which is configured to be placed over the P-trap L-shaped pipe section 88 extending from the trap section 24 to the wall 29. L-shaped cover piece 82 has a generally elongated cylindrical tubular body 84 which extends from the wall end 86 of L-shaped pipe section 88 to a curve section 90 at the opposite end 94. The curve 90 of cover piece 82 is approximately 90° to form the L-shape and a short portion 92 extends downwardly from the curve 90 to the end 94 of L-shaped pipe section 88. The wall end 86 of pipe section 88 is connected to the internal plumbing (not shown) of the structure which lies behind the wall 29 (see FIGS. 1, 2, and 3). A pipe nut 96 is affixed to the end 94 of L-shaped pipe trap section 88 for fastening pipe section 88 to the J-shaped pipe section 98. Integral with the short portion 92 of cover piece 82 is a flexible collar 100 which may be folded back along short portion 92 away from nut 96 during installation of piece 82. Similar to collar 78, collar 100 is preferably dimensioned larger in diameter than body and short portion 92 and is flexible to fold forward to cover nut 96 after assembly of the P-trap drain and the invention has been completed as described further below (See FIG. 5). The J-shaped trap section 98 has threaded portions on the ends 104, 106 thereof onto which nuts 80 and 96 are screwed, respectively, to secure the P-trap drain pieces together into a completed P-trap drain assembly as shown in FIGS. 1, 2, 3, and 5. As with cover piece 70, the L-shaped cover piece 82 is designed to cover the generally L-shaped pipe section 86 and may deviate from an exact L-shape without deviating from the scope of the invention.

J-shaped trap pipe section 98 is covered by the generally J-shaped cover piece 108 of the invention. J-shaped cover piece 108 has two generally parallel straight sections 110, 112 and a 180° bend 114 so as to adequately cover the J-shaped pipe section 98. J-shaped cover piece 108 has flexible collars 116, 118 proximate ends 104, 106, respectively which roll back along the straight sections 110, 112 respectively when the cover piece 108 is installed onto the J-shaped pipe section 98. Piece 108 is installed over pipe section 98 and the collars 116, 118 are folded back along sections 110, 112 as shown in FIG. 4. When the collars 116, 118 are folded back and downwardly, the threads of pipe ends 104, 106 are exposed to receive nuts 80 and 96, respectively so that the various pipe sections may be assembled together at junctures. The collars 116, 118 of cover piece 108 are preferably dimensioned larger than the end portions 104, 106.

Figure 15:
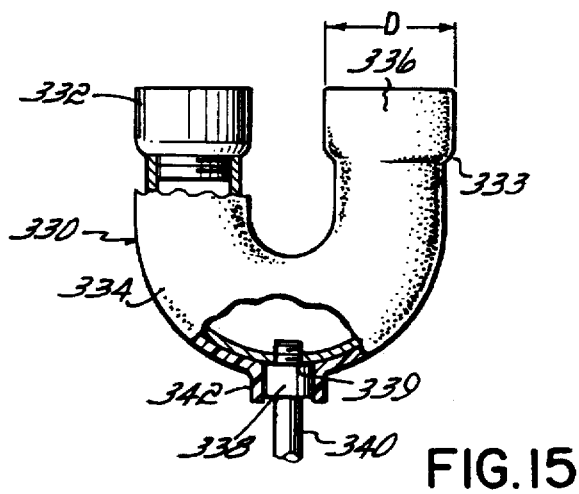
FIG. 15 is a side view of a setup for coveting a J-shaped trap pipe section with an insulative cover layer in accordance with the principles of the present invention.

The cover piece 108 in one embodiment of the invention has longitudinal slits 117 and 119 on the lengths of sections 110 and 112, respectively. The slits 117, 119 extend downwardly from the collared ends of piece 108 to proximate the bend 114 and allow sections 110, 112 to be spread or split apart for easier installation of cover piece 108 over the pipe section 98. In an alternative embodiment of the invention, as shown in FIG. 15 and discussed further hereinbelow, the J-shaped pipe section 98 is covered with a layer of insulative cover material. In that embodiment, the longitudinal slits would generally not be necessary because an insulative cover layer is already on the pipe section 98.

When the pipes 72, 88, and 98 are assembled together and nuts 80 and 96 are securely fastened to the ends 104, 106 of pipe 98 to complete the P-trap and form a watertight seal at the junctures between the pipe sections, the flexible collars 116, 118 of J-shaped cover piece 108 are folded upwardly to cover the juncture between the pipes and to cover the respective pipe nuts 80 and 96. Then, collars 78 and 100 on cover pieces 70 and 82 are folded downwardly over nuts 80 and 96, respectively. As shown in FIG. 5, the opposing collars 78, 116, and 100, 118 form a double overlap of the junctures between the various pipe sections of the assembled P-trap drain. The double overlapping collars provide a continuous coverage of the P-trap drain assembly from the wall through the trap section and upwardly to the sink. Furthermore, the double overlapping collars cover a portion of the slits 117, 119 and close the slits to secure cover piece 108 to the pipe section and prevent dirt or bacteria from being trapped in an open slit. FIG. 2 shows a covered P-trap assembly using the various cover pieces 70, 82, and 108 of the present invention. The invention, by providing a complete insulative cover over the P-trap assembly, protects a person contacting the undersink piping from abrasions and burns.

In accordance with the present invention, the folding of the opposing flexible collars during assembly might be reversed, such as by having the flexible collars 116 and 118 of section 108 overlap collars 78 and 100, respectively. However, it is desirable to have the upper collars 78, 100 overlap the lower collars 116, 118 in order to prevent an outer upturned collar which may collect dirt and other bacteria beneath the sink. As may be seen in FIGS. 2, 3, and 5, the completely assembled P-trap cover assembly of the present invention provides an aesthetically pleasing and smooth drain piping cover which completely covers and insulates the P-trap drain piping to prevent injury to persons that come in contact with the undersink piping.

Figure 6A:
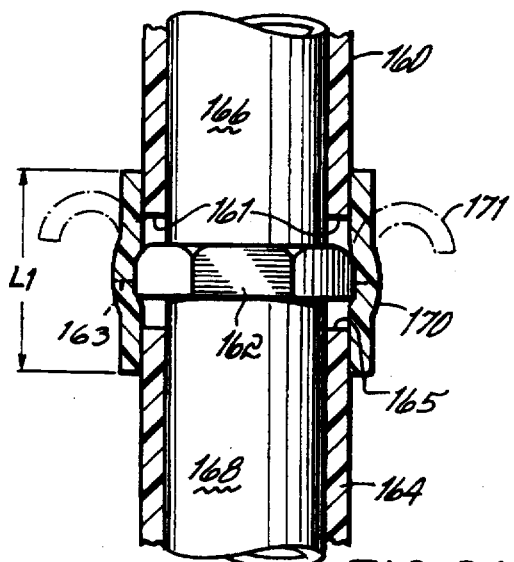
FIGS. 6A, 6B, 6C, and 6D are side views, in partial section, of various versions of the embodiment of the present invention utilizing a sliding collar structure.

Alternatively, FIGS. 6A, 6B, 6C, and 6D (6A–6D) illustrate alternative embodiments of the present invention which utilize slidable collar structures which are separate from the individual cover pieces. Specifically, the collar structures of FIGS. 6A–6D are configured to be slid generally upwardly or downwardly with respect to the pipe juncture and the adjacent pipe sections and insulative cover pieces. Referring to FIG. 6A, a cover piece 160 with an end 161 is placed proximate a fastening structure such as fastening nut 162. The cover piece 160 may be slid over pipe section 166 before the pipe section 166 is assembled into a drain assembly or may be placed on the pipe after the drain assembly in completely assembled. The end 161 is positioned near a pipe juncture on one side of fastening nut 162. Another cover piece 164 with an end 165 is positioned proximate to fastening nut 162 on the other side of the nut opposite cover piece 160. Cover pieces 160 and 164 are situated on pipe sections 166 and 168 such that their respective ends 161 and 165 are adjacent the juncture between the pipe sections. The pipe juncture could be either the forward juncture 214 or rearward juncture of the undersink P-trap piping assembly 215 as shown in FIG. 7. Accordingly, the cover pieces 160, 164 may be either two of the three cover pieces 70, 82, and 108 as shown in FIG. 2, for example. A collar structure 170 is shown around the pipe juncture and nut 162 and is dimensioned larger than one or both of the insulative cover pieces 160, 164 such that it may be slid on the respective cover piece to be moved toward or away from the juncture.

When installing the insulative cover assembly with collar structure 170, the cover pieces 160 and 164 are first placed over their respective pipe sections 166 and 168. Collar structure 170 is then placed on a pipe section 166, 168 and is slid downwardly over cover piece 160 or upwardly over cover piece 164 to cover fastening nut 162 and the pipe juncture and to overlap the respective ends 161 and 165 of cover pieces 160 and 164 when the pipe sections 166, 168 are assembled together. Preferably, collar structure 170 is dimensioned in length L1 to overlap the ends 161 and 165 simultaneously to provide a generally continuous insulative cover structure over the pipe juncture as shown in FIG. 6A. However, as may be appreciated, the collar structure may be dimensioned to extend between ends 161, 165 to leave a small portion of one or both of the pipe sections exposed or may abut against the ends 161, 165 (not shown) herein, general continuous covering of the pipe juncture refers to either complete coverage, such as overlapping collars and cover piece ends, or coverage wherein the collars and cover pieces abut or leave exposed a small section of pipe. In either scenario, the present invention provides sufficient insulation and protection of the pipes. Collar structure 170 is preferably made of the same insulative material used to make the cover pieces 160, 164. For example, collar structure 170 might be made of a flexible material which will allow the collar structure 170 to be folded back after it has been slid over nut 162 in the pipe juncture to allow access to nut 162 and the pipe juncture. Such a flexible collar 171 is shown in phantom in FIG. 6A.

Figure 6B:
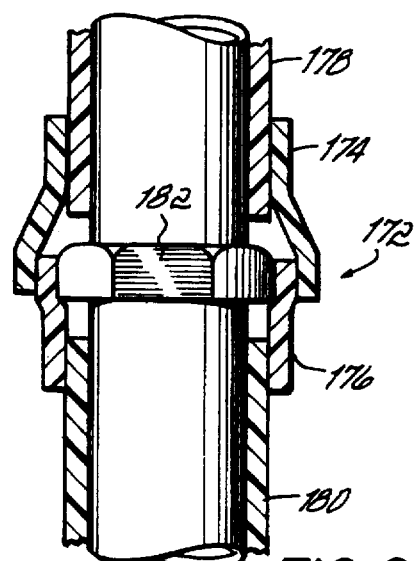
Figure 7:
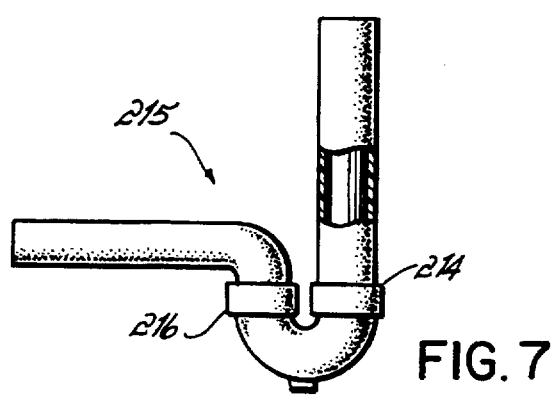
FIG. 7 is a side view of a sink assembly with the undersink piping covered by the present invention and associated collar structures.

FIG. 6B illustrates an alternative version of the slidable collar as shown in FIG. 6A. Specifically, the collar structure 172 includes two opposing collar pieces 174 and 176 wherein one of the collar pieces overlaps the other. Both of the collar pieces 174 and 176 are configured and dimensioned to fit over their respective cover pieces 178 and 180 such that they may be slid individually over these cover pieces. For example, collar piece 174 would be slid upwardly and downwardly on cover piece 178 while collar piece 176 would be similarly slid over cover piece 180. Once the pipe sections are fastened together by fastening nut 182, the collar pieces 174 and 176 overlap one another to form a generally continuous insulative cover pieces collar structure at the juncture as shown in FIG. 6B. While collar piece 174 is shown to overlap collar piece 176, it should be understood that piece 176 might overlap piece 174. Alternatively, the two collar pieces 174 and 176 might abut against each other rather than overlap to form a generally continuous insulative cover over the pipe juncture. As discussed with FIG. 6A, the collar pieces 174 and 176 might also be flexible to allow them to be folded back (not shown) when it is necessary to access to fastening nut 182 at the pipe juncture.

Figure 6C:
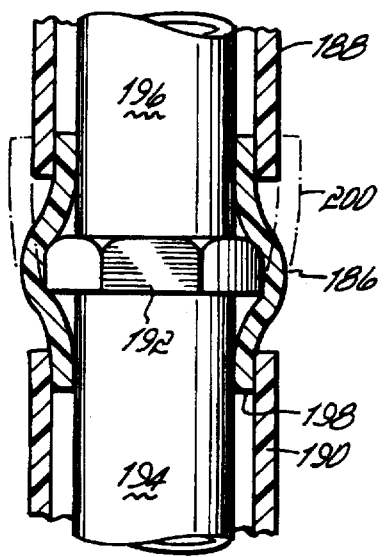
Figure 6D:
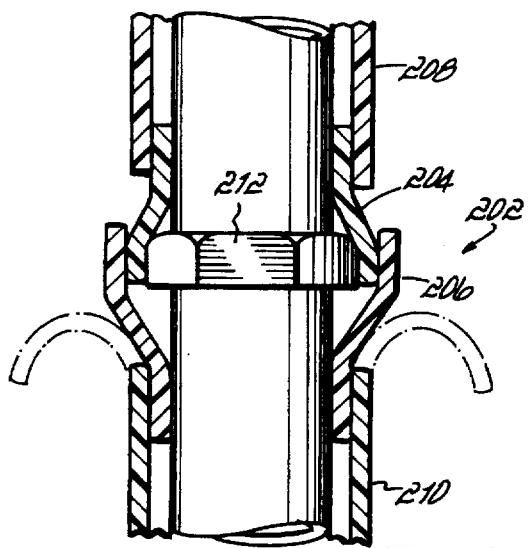

FIGS. 6C and 6D illustrate still further versions of the slidable collar structure of the present invention. FIG. 6C shows a slidable collar structure 186 which is dimensioned generally smaller in diameter than the diameter of the adjacent cover pieces 188 and 190. In that way, slidable collar 186 may be slid upwardly or downwardly with respect to fastening nut 192 and the pipe juncture and within one of the adjacent cover pieces 188 and 190. In use, collar 186 might be slid downwardly into cover piece 190 between the cover piece 190 and the respective pipe section 194. Pipe section 194 would then be attached to an adjacent pipe section 196 by fastening nut 192, and the collar structure 186 would be slid upwardly over nut 192 and over the pipe juncture. Cover 186 might also be dimensioned to partially slide within cover piece 188 between the cover piece 188 and pipe section 196. Alternatively, as shown in phantom in FIG. 6C, while the lower end 198 of collar structure 186 might be dimensioned to slide partially inside of cover piece 190, the upper end 200 might be dimensioned to have a diameter larger then the outer diameter of cover piece 188, and accordingly, the upper end 200 of collar structure 186 would slide on the outside of cover piece 188. Still further, the collar 186 might be flexible to expand and extend over the ends of the cover pieces, or the ends of the cover pieces may be flexible to roll back and then roll forward over the collar structure 186. As mentioned above, collar structure 186 is preferably dimensioned in length so that it completely covers fastening nut 192 and the pipe juncture and overlaps with each of the respective cover pieces 188, 190 to provide a generally continuous insulative cover over the pipe juncture.

FIG. 6D discloses an alternative version of the slidable collar structure illustrated in FIG. 6C, which is partially slidable inside at least one of the respective cover pieces at a pipe juncture. More specifically, slidable collar structure 202 of FIG. 6D includes opposing collar pieces 204 and 206 wherein one or both of the collar pieces 204 and 206 are partially slidable inside of their respective cover pieces 208 and 210. Preferably, collar pieces 204 and 206 are dimensioned to overlap at fastening nut 212 to completely cover the pipe juncture. Alternatively, the collar structures might be dimensioned such that they only abut one another at their ends proximate fastening nut 212. Further, the collar structure 202 created by overlapping collar pieces 204, 206 might be dimensioned to slide partially inside and partially outside the respective cover pieces. As mentioned above, collar structure 186, or alternatively collar pieces 204 and 206 might be made of a flexible material to be folded away from the respective fastening nuts 192, 212 and the pipe junctures whenever necessary, as shown in phantom in FIG. 6D.

As mentioned, the slidable collar structures of FIGS. 6A–6D might be utilized at either of the major pipe junctures of a P-trap piping assembly. For example, as shown in FIG. 7, the slidable collar structures of FIG. 6A–6D might be utilized to cover the forward pipe juncture 214 and rearward pipe juncture 216 of a P-trap assembly 215. As discussed further hereinbelow, alternative collar structures might also be utilized at junctures 214 and 216 in order to cover the junctures and form a generally continuous insulative cover over the P-trap assembly in accordance with the present invention.

FIGS. 8A and 8B disclose an alternative embodiment of the present invention utilizing a collar structure which may be wrapped around a pipe juncture to form a generally continuous insulative cover. Specifically, FIG. 8A illustrates a wrappable collar structure 220 which has opposing ends 221 and 222 which may be fastened together to form a continuous collar structure around a fastening nut 224. Preferably, collar structure 220 is dimensioned in length L2 to partially overlap the adjacent cover pieces 225 and 226 at the pipe juncture. However, collar structure 220 may abut with the ends of the cover pieces. Once the cover pieces 225, 226 have been placed on their respective pipe sections and the pipe sections have been attached together by fastening nut 224, collar structure 220 is wrapped around the pipe juncture and fastened at its ends by an appropriate fastening structure. Several examples of appropriate fastening structures are illustrated in FIGS. 8A and 8B. For example, a suitable fastening structure might include a tab 228 and an opposing slot 229 which receives the tab 228 and holds the opposing collar structure ends 221, 222 together. Alternatively, opposing strips 230, 231 of a hook and loop fastener, such as VELCRO®, might be utilized wherein the opposing ends 221, 222 would overlap as shown in FIG. 8A. FIG. 8B shows another alternative fastening structure, including a tongue 232 and groove 233 which receives the tongue and fastens opposing ends 221, 222 together.

Thereby, the wrappable collar structure 220 of FIGS. 8A and 8B may be easily and quickly installed around a fastening nut 224 and pipe juncture, and just as readily removed from the pipe juncture. Wrappable collar structure 220 might also be dimensioned to slide up and down on the respective cover pieces 225, 226 once it has been installed similar to collar structures illustrated in FIGS. 6A and 6B or may be made to flex so that it may be rolled back.

FIGS. 9A and 9B illustrate another embodiment of the insulative cover of the present invention. Instead of utilizing a separate collar structure to cover the fastening nut and juncture, the fastening nut 236 is covered with a layer of insulative material 238. The layer of material 238 encircles nut 236 and preferably is dimensioned longer in length L3 than the thickness T of nut 236 to extend above and below the pipe juncture covered by nut 236. The opposing cover pieces 240, 242 have respective ends 243, 244 which abut against the insulative material layer 238 of nut structure 236 to form a generally continuous insulative cover at the pipe juncture. Alternatively, the cover pieces 240, 242 may overlap the nut cover 238 or vice versa. The insulated nut eliminates the necessity of assembling the pipe sections and then placing a collar over the fastening nut and pipe. Instead, the pipe sections are covered with their respective cover pieces and then are fastened together with the insulated nut 236 to provide a continuous insulative cover at the juncture.

Insulated material layer 238 might also be dimensioned in length such that an overlap portion extends from one or both ends of the nut structure 236. As shown in FIG. 9B, the insulated nut structure 246 includes a layer of insulated material 248 which has an extension portion 249 which extends beyond an end 250 of an adjacent insulative cover piece 252. The extension portion 249 overlaps with end 250 of cover piece 252 to provide continuous coverage of the juncture. The extension portion 249 illustrated in FIG. 9B is dimensioned to slide within cover piece 252 such that the cover piece overlaps extension portion 249. Alternatively, and as shown in phantom in FIG. 9B, the extension portion 249 might also be dimensioned to overlap the end 250 of cover piece 252. As mentioned, the insulative nut structures illustrated in FIG. 9A and 9B, eliminate the need to utilize a collar structure or a flexible collar portion in order to insulate the pipe juncture. In use, the insulative cover pieces, such as cover pieces 240 and 242, are inserted over their respective pipe sections and pipe sections are fastened together utilizing an insulated nut structure such nut structure 236. When the pipe sections are fastened together, the ends 243, 244 of the cover pieces are then moved to abut nut structure 236 and the layer of insulative material 238 or may already be placed proximate the pipe juncture such that ends 243, 244 automatically abut against the nut structure 236 and the layer of insulative material 238. Alternatively, the cover pieces might be made to overlap an extension portion of the insulated fastening nut as shown in FIG. 9B. It will be appreciated that the collar structures and insulated nut structures of FIGS. 6A–6D, 8A–8B, and 9A–9B may be utilized for either of the forward and rearward junctures 214, 216, of an undersink piping assembly as shown in FIG. 7.

FIG. 10 discloses another alternative embodiment of the undersink piping cover assembly of the present invention. The cover assembly includes an L-shaped cover piece 256 and a J-shaped cover piece 258 which cover the respective pipe pieces of the undersink drain piping assembly 259. A generally straight cover piece 260 is placed on a pipe section 262 which extends between a drain opening 263 and the trap pipe section 264 covered by the J-shaped cover piece 258. A fastening nut 266 couples pipe sections 262 and 264 together at a pipe juncture. Cover piece 260 is dimensioned to have a length shorter than the length of the respective pipe section 262 which it is covering. Piece 260 is slidable upwardly and downwardly on the pipe section 262. The piece 260 is slid upwardly to expose the pipe juncture, and is then slid downwardly after the pipe sections 262, 264 are fastened together by nut 226 at the juncture. More specifically, when pipe sections 262 and 264 are fastened together, cover piece 260 is moved upwardly, exposing nut 266 and the pipe juncture. When piece 260 is moved downwardly to cover fastening nut 266 and the pipe juncture after the pipe sections 262 and 264 have been assembled together, the cover piece 260 leaves an exposed portion 268 of pipe section 262 proximate the drain opening 263. To cover the exposed portion 268 collar structure 270 is placed over the portion. The collar structure 270 is preferably a collar structure similar to the collar structures disclosed in FIGS. 2, 3, 4, 5, 6A–6D, and 8A–8B and discussed hereinabove. That is, collar structure 270 might be a slidable or wrappable collar structure which may be slid down or unwrapped, respectively, to expose portion 268 of the pipe 262 so that cover piece 260 may be slid up and down on pipe section 262. Alternatively, a flexible collar might be folded downwardly to expose portion 268 when it is slid up and down on the pipe section as designated 269 in FIG. 10. Once the piece 260 has been moved down over nut 266 and the pipe juncture, and the collar structure 270 covers the exposed portion 268, a generally continuous insulative cover is presented from drain opening 263 all the way to the wall 271 While the slidable cover piece is shown on the generally straight pipe section, the cover piece might also be similarly constructed and operable on the L-shaped pipe section.

Figure 11A:
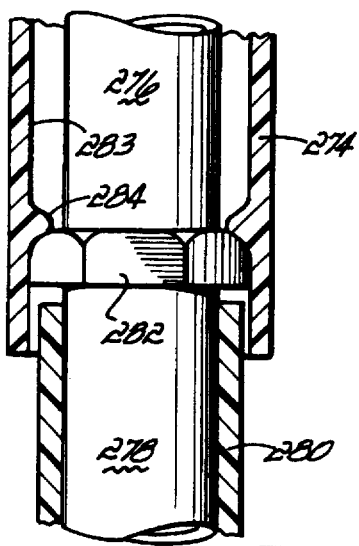
FIGS. 11A and 11B are side views, in partial section, of the generally straight cover piece of FIG. 10 showing a stop projection on the cover piece.
Figure 11B:
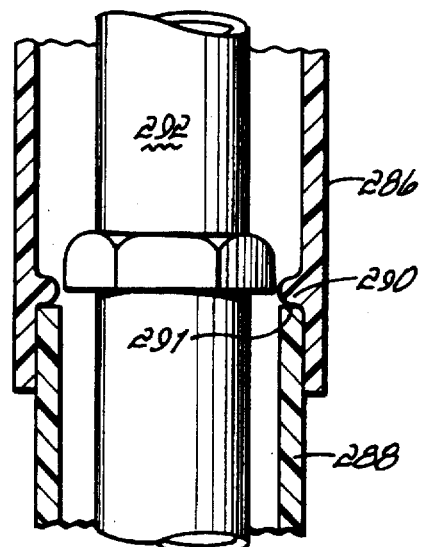
Figure 12:
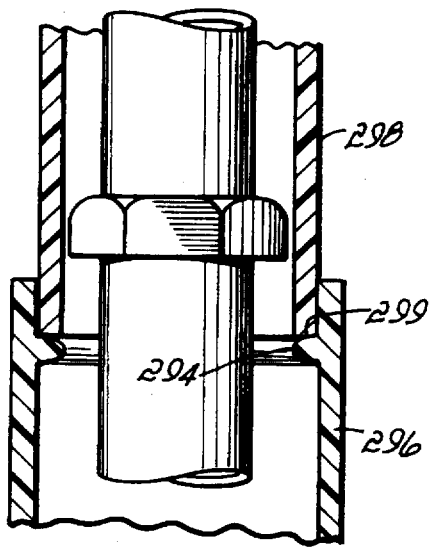
FIG. 12 is a side view, in partial section, of an alternative embodiment of the cover assembly of FIG. 10 with the stop projection on the J-shaped cover piece.

In accordance with the embodiments of the present invention disclosed hereinabove, the cover piece 260 might utilize a collar proximate the pipe juncture to fit over and cover nut 266 and the associated pipe juncture, and limit the downward movement of cover piece 260 to a predetermined position. Alternatively, and as illustrated in FIGS. 11A, 11B, and 12, a stop projection might be utilized at the end of the generally straight piece 260 or the end of the J-shaped piece 258 in order to limit the downward motion of cover piece 260 when it is brought down to cover nut 266 and the pipe juncture. In such a case, the cover pieces would preferably have uniform diameters along their length, although variations from a uniform diameter might be utilized in accordance with the principles of the present invention as will be recognized by persons of ordinary skill in the art. For example, FIG. 11A illustrates a cover piece 274 which is preferably dimensioned shorter in length than the length of respective covered pipe section 276. Attached to pipe section 276 is another pipe section 278 which is covered by an insulative cover piece 280, which is preferably, although not necessarily, stationary with respect to pipe section 278. Pipe sections 276 and 278 are attached by a fastening nut 282. Extending inwardly of the inner wall 283 of cover piece 274 is a stop projection 284 which preferably encircles the entire pipe. As will be appreciated by a person of ordinary skill in art, stop projection 284 might not completely encircle pipe section 276, but may instead extend inwardly of wall 283 in sections at various positions around pipe section 276. The stop projection halts the downward movement of cover piece 274 when the cover pieces 274, 280 are seated together to cover the juncture. One version of this stop projection 284 is dimensioned to extend inwardly of wall 283 so that it abuts against fastening nut 282 when the cover piece 274 is slid downwardly to cover nut 282 and the pipe juncture as shown in FIG. 11A.

In an alternative version, the various cover pieces might be dimensioned larger than the respective pipe sections such that the stop projection of one cover piece abuts against an end of an adjacent cover piece instead of abutting against the fastening nut in order to situate the various cover pieces at a predetermined position with respect to the pipe juncture. More specifically, the embodiment shown in FIG. 11B utilizes cover pieces 286 and 288 with a stop projection 290 situated on piece 286. The stop projection 290 on piece 286 abuts against an end 291 on cover piece 288. Similar to the version illustrated in FIG. 11A, cover piece 286 may be slid upwardly on the respective pipe section 292 and then downwardly to cover the pipe juncture and present a generally continuous insulative cover. Preferably, the stop projection is positioned on the respective cover piece such that there is an overlap between the adjacent cover pieces at the juncture. As mentioned, cover piece 286 is stopped in its downward motion by stop projection 290 which abuts against the end 291 of the lower cover piece 288.

As illustrated in FIG. 12, a stop projection 294 might be positioned on the lower cover piece 296 while the upper cover piece 298 is moved with respect to the pipe juncture. Cover piece 298 would then be slid upwardly and downwardly and the lower end 299 of cover piece 298 would abut against stop projection 294 to prevent any further downward sliding of cover piece 298. Again, as shown in FIG. 12, it is preferable to position the stop projection 294 such there is overlap between the ends of the respective cover pieces 296 and 298.

Figure 13A:
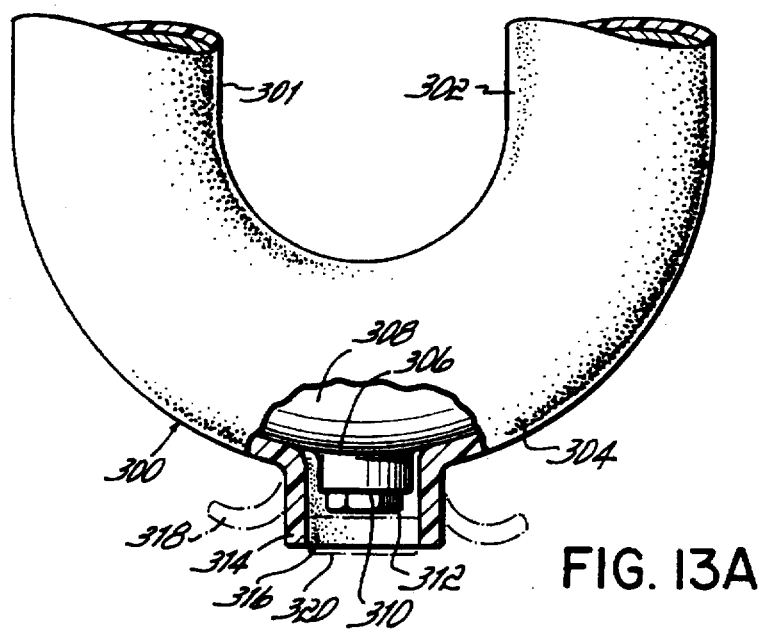
FIGS. 13A, 13B, and 13C are side views, in partial section, of an alternative embodiment of the J-shaped cover piece of the present invention, including a projection allowing access to a drain opening with various projection sealing apparatuses.
Figure 13B:
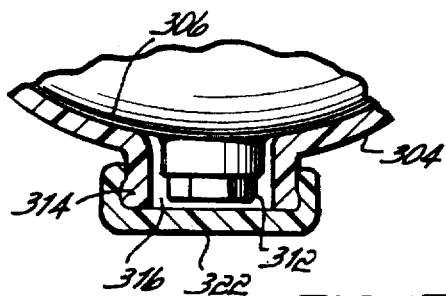
Figure 13C:
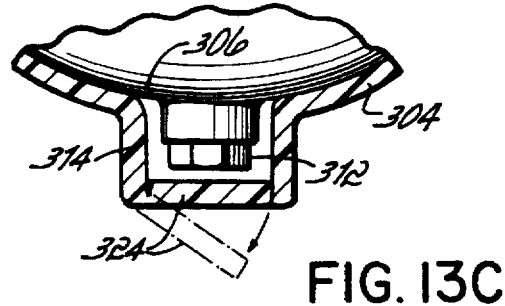

An alternative embodiment of the J-shaped cover piece utilized with the present invention is shown in FIGS. 13A, 13B and 13C. The cover piece 300 includes a first straight portion 301 and a second straight portion 302. The straight portions are connected by a curved portion 304 which has an outermost point 306. Generally, the J-shaped piping section or trap pipe 308 of an undersink drain piping assembly will include a drain opening 310 which is sealed by a closure plug 312. The drain opening 310 allows the inside of the trap pipe 308 to be accessed in case some small object is dropped down the sink, such as a ring or other valuable. The closure plug 312 may be removed so that the item sitting in the bottom of the trap pipe 308 may be retrieved through the drain opening 310. The cover piece 300 of the present invention utilizes an opening and preferably a hollow projection with extends from the curved portion 304 proximate the end most point 306. The projection 314 surrounds drain opening 310 to cover and insulate the drain opening to prevent scalding or abrasion to a person who brushes against the trap pipe 308. An opening 316 is defined at one end of projection 314 to allow access to drain opening 310. The projection 314 may be utilized to access the drain opening to retrieve a lost item from trap pipe 308 without removing cover piece 300 from the pipe. This amounts to a substantial savings of time and effort because the P-trap piping assembly remains together and the insulative cover on the piping assembly remains in position. That is, the pipes do not have to be disassembled and subsequently reinsulated with various cover pieces.

In one version of the cover piece 300, the projection might be formed of a flexible material so that is may be folded back as shown by phantom projection 318 in FIG. 13A. Furthermore, the projection opening 316 might be closed with an appropriate closure to provide complete insulative coverage of trap pipe 308. For example, FIG. 13A shows a closure plug 320 (shown in phantom) which might cover drain opening 310. Alternatively, FIG. 13B shows a closure cap 322 which may be placed over opening 316 of projection 314. In a further alternative version, FIG. 13C discloses a closure flap 324 which is hingedly attached to projection 314 and which is opened and closed as shown in the figure to allow access to the drain opening. While a projection is preferable on cover piece 300, an aperture might simply be formed to allow access to the drain opening without projection 314 extending from the piece.

As shown in FIG. 1 and discussed above, the undersink drain piping may include an offset grid drain piece 35 which moves the P-trap piping assembly rearwardly a distance D from the front of sink basin 56 to provide more undersink room for a person in a wheelchair to access the sink. To cover the offset grid drain 35 (show in FIG. 4 in phantom with reference number 121), the invention includes an offset grid drain cover piece 120 as shown in FIG. 4 which includes a generally horizontal long portion 122, 90° curve 124 and a shorter vertical portion 126. While a 90° curve in an offset grid drain is typical, other angles may be utilized and the cover piece 120 may be configured to match a particular drain without deviating from the scope of the present invention. An opening 127 is defined at one end of the short portion 126 while the long portion 122 bends at approximately 90° at the end opposite curve 124 to define an opening 123 that has an axis generally parallel the longitudinal axis of the short portion 126 and generally perpendicular the long portion 122. Opening 123 is configured and dimensioned to lie generally against the bottom of a sink covering the drain opening while cover piece opening 127 is oriented and dimensioned to receive the upper end of the straight cover piece 70. When assembled, the offset grid drain cover piece 120 meets straight cover piece 70 to form a completed cover over the pipe juncture between the straight pipe 74 and offset grid drain 121 (See FIGS. 3, 4, and 5).

The shorter vertical portion 126 of offset grid drain cover piece 120 includes a flexible collar 128 and a detachable securing band 130 at the lower end thereof which define opening 127. Collar 128 and band 130 are flexible to be folded back along vertical portion 126 when the cover piece 120 is installed over grid drain 121 (See FIG. 4A). As further discussed hereinbelow, band 130 may be supplied as a separate piece as opposed to being detachably fixed to the flexible collar 128. To facilitate easy installation of cover piece 120 over grid drain 123, a longitudinal slit 132 extends along horizontal portion 122 from opening 121 to preferably curve 124. In use, cover 120 is split or spread apart along the horizontal slit 132 and placed around the offset grid drain 121 as shown in FIG. 4.

Offset grid drain 121 and straight pipe section 74 of the P-trap are secured together during installation by a nut or other mechanism such as pipe nut 129 (See FIG. 4A). Once the juncture between pipe sections 74 and 121 is completed and sealed in a watertight seal, flexible collar 128 is folded downwardly to cover nut 129 and the juncture between pipe section 74 and drain 121. However, as illustrated in FIG. 4A, prior to folding collar 128 down, detachable band 130 is severed from collar 128 and is slid up along portion 126, over curve 124, and onto horizontal portion 122, partially overlapping horizontal slit 132 and holding cover piece 120 closed at slit 132. This further secures cover piece 120 to the offset grid drain 121. In an alternative embodiment, band 130 may be formed and used as a separate piece. The separate band would then be slid over cover piece 120 to close slit 132 when the cover piece is applied. A separate band would function similar to the detachable band shown in FIG. 4A. FIG. 4A shows band 130 in phantom before it has been detached from folded collar 128 and shows it again after it has been moved to encircle portion 122 and hold cover piece 120 together at slit 132. Band 130 may be detached from flexible collar 128 by being cut, such as with a knife, or the band 130 may include perforations around the point of connection 131 to collar 128. Such perforations would allow easier severance such as with a less sharp instrument or even by hand. Cover piece 120 completely covers the offset grid drain 121 and is secured thereon through the use of band 130.

When the P-trap assembly including offset grid drain 121, is complete, the flexible collar 128 is folded downwardly over the junction between the grid drain 121 and pipe section 74 to overlap the upper end of the straight cover piece 70 and provide complete coverage and insulation at the juncture between the two pipe sections. Flexible collar 128 extends downwardly to prevent dirt and other bacteria from being trapped under the collar. FIG. 5 shows the installed cover piece 120 of the present invention which is secured to the offset grid drain with band 130. As may be appreciated, the use of an offset grid drain 121 moves the P-trap rearwardly from the front of the sink basin (See FIG. 3). Accordingly, when using the present invention with undersink piping having an offset grid drain, the length of L-shaped cover piece 82 may need to be reduced. This may be done by either manufacturing a shorter piece or cutting a longer L-shaped piece down to size prior to installation in the field.

In another embodiment of the present invention, the offset grid drain pipe section and the J-shaped pipe section or trap pipe section are covered with a smooth layer of insulative material to insulate the respective pipe section to prevent burns or abrasions as discussed above. Offset grid drains and trap pipes have curved portions which make it difficult to slip a separate cover piece over the pipe section when an undersink drain piping assembly is being insulated. In the past, it has been necessary to put a slit in the cover piece over its entire length in order to facilitate installation of the cover piece under the respective trap pipe or offset grid drain. Such slits leave openings and crevices in which dirt and bacteria are trapped and collected. As may be appreciated, in sterile environments such as hospitals and other medical or even industrial facilities, the reduction of bacteria and other contaminants is of paramount importance. Furthermore, the slits on the pieces make them difficult to secure on the pipes. Accordingly, cover pieces which include various slits or openings may not be suitable for such sterile applications and are sometimes difficult to use.

In accordance with the principles of the present invention, the trap pipe and offset grid drain of an undersink piping assembly are covered with a layer of insulative material such that there is generally a continuous cover over the respective pipe section. It should be understood that the other pipe sections might be similarly insulated and covered, although the curved pipe sections make them particularly appropriate for the present invention. In accordance with the present invention, the layer of insulative cover material does not have a slit or opening along a substantial portion of its length and preferably does not have any slit or opening anywhere thereon to provide a generally continuous cover piece to completely cover the pipe section and reduce dirt and other contaminants from being trapped on the pipe section and insulative cover. A unique method is utilized in order to cover an undersink pipe section with a layer of insulative material which is continuous along the length of the pipe section. The resulting insulated pipe section enables a more efficient installment of the insulated undersink drain piping. Furthermore, when completed, the insulative cover assembly is free from any openings or slits which may collect dirt and contaminants.

In a preferred insulating method, a piping section to be covered is pre-heated in a range of approximately 100° F. to 750° F. and preferably around 350° F. The ends of the pipe sections to be covered are protected, such as by being sealed, with an appropriate closure to prevent insulative material from being applied to the inside walls of the pipe section and to prevent the covering of any threads with a layer of insulation. For example, as illustrated in FIG. 15, a J-shaped pipe section 330 is sealed at its ends by threaded caps 332. The caps 332 screw onto the ends of the J-shaped pipe section which are also threaded. The caps 332 are dimensioned in length and configured such that when the layer of insulative material 334 is applied in accordance with the principles of the present invention, collar sections 336 are created at the ends of the insulated pipe section as will be described in greater detail hereinbelow. The collar sections 336 overlap the securing nuts which are used to attach the other pipe sections of the drain assembly to pipe section 330 in order to form a continuous insulative cover over the entire drain assembly. Generally, the J-shaped trap pipe sections are sized in 1¼" and 1½" diameters. The caps 332 are sized accordingly to produce collar sections 336 of larger diameter than the pipe sections. Preferably, the caps 332 are dimensioned to have the same outer diameter for both the 1¼" and 1½" trap pipe sections to yield a consistent diameter collar section 336 so that the cover pieces on the straight and L-shaped pipe sections will operate readily with either sized trap pipe. Alternatively, the caps 332 might be configured so that there are no collar sections formed, and separate collar structures as discussed above are utilized.

After the ends of the pipe section 330 have been sealed or otherwise protected, a layer of liquified insulation material is then applied to the heated pipe section 330 to cover generally the entire pipe section. In a preferred embodiment of the present invention, a layer of liquified insulation material is applied to the heated pipe section 330 by dipping the pipe section within a container containing liquified insulation material. It has been found that the dipping method provides a smooth continuous coating on the pipe section free of air bubbles or other gaps in the insulative layer which may expose a section of the pipe or may trap dirt and contaminants. One suitable insulation material for insulating the pipe sections according to the method of the present invention is Vinyl Plastisol as mentioned above.

When covering a trap pipe section, such as pipe section 330, the pipe section is preferably inverted when it is dipped into the liquified insulation material. Referring again to FIG. 15, another plug 338 is fixed within the drain opening 339 of pipe section 330. A stem 340 extends from plug 338 and is fixed to an appropriate supporting structure so that pipe section 330 may be dipped in the accordance with the principles of the present invention. Plug 338 is dimensioned such that a layer of insulation material adheres thereon and forms a projection to cover the drain opening 339 as disclosed in FIGS. 13A, 13B and 13C and discussed in greater detail hereinabove. As may be appreciated, the liquified insulation material will tend to run somewhat after pipe section 330 has been dipped and there is a tendency for drippage to occur along the pipe section 330. The drippage terminates in undesirable streaks and small material nipples which degrade the look of the insulated pipe section. It has been found that inverting the pipe section 330 concentrates the streaks and nipples at the ends of the pipe sections proximate the caps 332. The material, including the streaks and nipples, may then be cut away from the caps 332 so that the caps may be removed from pipe section 330.

When the pipe section is dipped into the liquified insulation material, it is preferably allowed to dwell in the material. The dwell time is approximately equal to the time that the pipe section was pre-heated. The preferred embodiment of the present invention utilizes a pre-heat temperature of approximately 350° F. for three to six minutes, and the pipe section should dwell in the liquified insulation material for approximately three to six minutes. As may be appreciated, other dwell times might be utilized in accordance with the principles of the present invention depending upon preheat times in order to achieve a suitable insulative layer on the pipe section.

After the pipe section 330 has been dipped and a layer of coating material is formed thereon, the pipe section is placed in a cure oven or a suitable heat curing device for a predetermined curing time to allow the layer of insulative material to harden. The curing time will also depend upon the time that the pipe section spent in the pre-heat stage. Again, in a preferred embodiment of the present invention, a curing time of approximately three to six minutes will generally be suitable when the pipe sections has been preheated at 350° F. for a similar amount of time before being dipped. The curing oven will be at a temperature somewhere in range between 75° F. and 900° F. and preferably around 350° F. Once the insulated pipe section has been sufficiently cured, it is removed from the cure oven and the ends of the pipe section are unsealed.

As discussed above, the insulation material is removed from the plugs 332 and the plugs are removed from the ends of the pipe section 330. When the plugs are removed, a suitable amount of insulation material remains to form collar sections 336. Referring again to FIG. 15, it may be seen that one end of the insulative caps 332 is tapered to form a transition section 333. Preferably, the transition section 333 of cap 332 is rounded. When the insulative material is cut away from cap 332, a collar portion 336 will exist which is generally wider in diameter D than the diameter of the insulated pipe section 330. The rounded transition section 333 on cap 332 insures a smooth transition from the smaller diameter pipe section to the larger diameter collar portion 330. The transition insures that if the collars are made flexible to be folded back, any tearing of the insulation material is limited at the transitions between the insulated pipe section 330 diameter and the collar portion 336 diameter. Of course, all of the material around cap 332 might be removed upon unsealing cover piece 330 so that no collar sections 336 are formed. In that case, wrappable or other suitable collar structure might be utilized in accordance with the principles of the present invention. When the plug 338 is removed, a projection portion 342 is formed at the outermost point of the curved region of the trap pipe due to the dimension of plug 338. As discussed above with respect to FIGS. 13A, 13B and 13C, the projection 342 provides coverage of the drain opening 339 and a closure plug which seals drain opening 339.

The unique method of covering the pipe section with insulative material yields a continuous insulative layer on the pipe section which contains no slits or other openings which might trap dirt and contaminants. Utilizing closures plugs and suspending the pipe sections from one or more of these plugs insures that there are no uninsulated points on the pipe section which might exist if the pipe section was clamped by a supporting structure. In accordance with the principles of the present invention, the pipe section might be sprayed with the liquified insulative material after it has been appropriately sealed rather than dipping the section. Still further, another process such as a molding process might be utilized to form a layer of insulation material on a pipe section in accordance with the principles of the present invention.

As mentioned above, once the pipe 330 section has been covered with a layer of insulation material, the end caps 332 are removed to expose the threaded ends of the pipe section 330. After the unneeded insulation material has been removed from the caps 332 and the caps have been unscrewed from the pipe section, the pipe section is generally ready to be installed beneath a sink. The junctures between the pipe sections may be covered by the collar portions 336 on the pipe section 330 or might be covered with other collar structures in accordance with the principles of the present invention. The insulated pipe section 330 would generally be free of a slit along a substantial portion of its length although slits might be made proximate the ends of the pipe section near a collar portion 336 in order to facilitate easier installation of the pipe section 330. Preferably however, the layer of insulative material on the pipe section 330 is completely free of any slits or openings along its entire length.

Similarly, offset grid drains of various shapes may be covered utilizing the insulating methods of the present invention. For example, FIGS. 14A and 14B disclose two versions of an offset grid drain. In FIG. 14A, the offset grid drain 350 has a threaded end 352 with internal threads which receive a plug 354 to seal the end and prevent insulation material from reaching the inside of the offset grid drain. Preferably, the plug 354 is configured with the threaded end 352 such that there is no build-up of insulative material proximate the threaded end. The offset grid drain 350 is generally installed such that the threaded end 352 abuts against the underside of a sink. Offset grid drain 352 has another end 356 which receives a cap 358 thereon. Cap 358 has an internal bore 355 so as to allow second end 356 of grid drain 350 to slide therein. The cap 358 is held in place by an appropriate fastening mechanism such as a set screw 359. A stem 360 or similar supporting structure extends from cap 358 and is utilized to hold the offset grid drain 354 while insulation material is applied such as by dipping the grid drain into liquified insulation material. When the layer of insulative material 362 is cured on the offset grid drain 350, the plug 354 is removed and any excess insulation material is cut away from the threaded end 352. Similarly, the cap 358 is removed from end 356 of the offset grid drain. The cap 358 may have a larger diameter than the offset grid drain 350 to produce a collar section 361 as shown in FIG. 14A. The collar section 361 operates similar to collar section 336 on the J-shaped pipe section of FIG. 15. Cap 358 also preferably has an angled transition 363 to allow flexing of collar section 361 if desired.

Figure 14B:
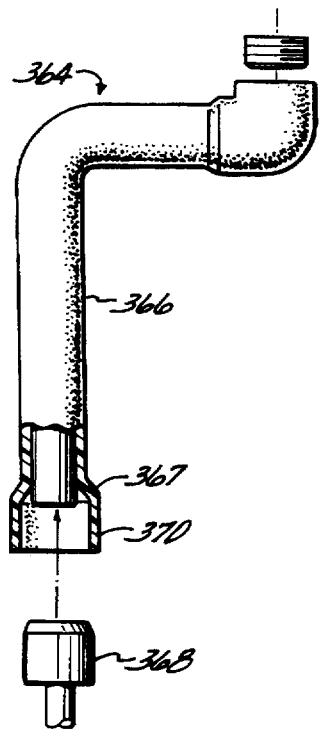
FIG. 14A and 14B are front perspective views a setup for covering various offset grid drains with an insulative cover layer applied in accordance with the principles of the present invention.
Figure 14A:
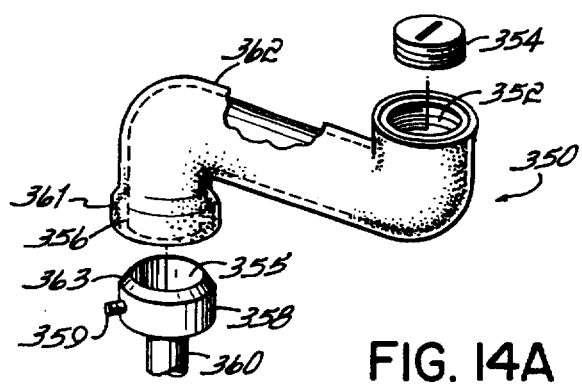

Referring now to FIG. 14B, an alternative version of the offset grid drain is shown and may be covered in a similar manner as discussed with respect to the offset grid drain of FIG. 14A. In the offset grid drain 364 of FIG. 14B, the generally straight cover piece utilized in various embodiments of the present invention has been incorporated into the structure of the offset grid drain. More specifically, one of the vertical sections 366 the offset grid drain 364 has been extended in a downward direction in order to connect directly to one end of a J-shaped trap pipe section. The extension 366 eliminates the need for a generally straight pipe section to connect the offset grid drain to the J-shaped trap pipe section and therefore eliminates the need for one of the respective cover pieces. The offset grid drain 364 is covered in a similar way as described with respect to the offset grid drain 350. Since the offset grid drain 362 with be utilized in place of a generally straight pipe section, the cap 368 which seals end 367 of the offset grid drain is preferably, although not necessarily, dimensioned such that when the offset grid drain is covered with liquified insulation material, a collar portion 370 is created. As discussed hereinabove, the collar portion 370 covers the pipe juncture and associated fastening structures such as a fastening nut.

The generally straight pipe sections and L-shaped pipe sections might also be covered utilizing the method as described; however, since these pipe sections are predominantly straight sections, separate cover pieces may be used to suitably cover the pipe sections and present an insulative cover which is free from slits or openings.

Conventional undersink piping further includes water supply pipes and valves commonly referred to as water angle valves. These water angle valves and associated piping must also be covered in compliance with various regulations, especially the hot water angle valve and piping which may scald a person if contacted uncovered. As shown in FIG. 1, typical water angle valves 31, 33 include a supply line 19, a valve 21 connected to the supply line, and a faucet line 23 which connects from the valve 21 to the sink plumbing such as faucet 14. The faucet line 23, when valve 21 is open, delivers water to the faucet 14 as determined by faucet valves 16, 18. Valves 21, 21 includes a valve handle 25 which is rotated to open and close valve 21 and deliver water to the faucet line 23, 23 and faucet 14.

The present invention as shown in FIGS. 3, 4, and 5 includes water angle valve covers for the hot and cold water angle valves. Since the angle valves are generally identical, the cover pieces are generally identical for the hot and cold water angle valves. Referring to FIG. 4, the angle valve cover comprises an elongated first piece 134 which is generally cylindrical in shape to fit over the supply line 137 and valve 139. The first piece 134 includes an elongated pipe portion 136 which is integrally attached with a valve portion 138. The valve portion 138 is dimensioned larger than the pipe portion to fit over valve 139. A vertical projection 140 extends generally perpendicular to the valve portion 138 to cover a vertical extension 141 extending from valve 139 in FIG. 4. The cover piece 134 has a longitudinal slit 142 from one end 135, along line portion 136 and part of portion 138, and up to and including one side of the projection 140. As shown in FIG. 4, longitudinal slit 142 allows piece 134 to be split or spread apart along most of its length to be installed over supply line 137 and valve 139. As further shown in FIG. 4, the extension 141 of valve 139 is connected to a faucet line 144, such as by using a pipe nut 145. The projection 140 on cover piece 134 extends over valve extension 141 when piece 134 is placed over line 137 and valve 139.

The invention further includes a second elongated cover piece 146 which is placed over faucet line 144 when the water angle valves are installed. At the end of cover piece 146, proximate pipe nut 145 and the juncture where line 144 meets the valve projection 141, cover piece 146 includes an integral, flexible collar 148. Collar 148 is preferably larger in diameter than the rest of cover piece 146 and is folded upwardly along cover piece 146 during installation. After the cover 134 has been placed over line 137 and valve 139, then cover 146 is placed over line 144, and line 144 is attached to valve 139. Next, flexible collar 148 is folded downwardly over nut 145, extension 141 and projection 140 to provide a complete cover over the juncture between valve 139 and faucet line 144. The downwardly extending collar 148 prevents dirt and bacteria from settling in the collar and being trapped thereunder. Collar 148 serves to hold the cover piece 134 together onto pipe 137 and valve 139 by holding the projection 140 together over a portion of the slit 142. Thus collar 138 secures cover piece 134 of the invention to line 137 and valve 139. To further secure cover piece 134, one or more external fastening wraps 150 might be utilized over slit 142 to hold cover piece 134 together along the slit (See FIG. 5).

Cover piece 134 further includes an opening or aperture 143 at the end of the valve portion 138. As shown in FIG. 4, the valve 139 of the water angle valve piping assembly includes a stem 145. Stem 147 attaches to a valve handle 149 (See FIG. 5) which is rotated to open and close the valve 139. During installation of cover piece 134, the stem 147 is inserted through aperture 143 and the handle 149 attached thereto. In one embodiment of the invention, a valve handle piece 152 is included which is configured to cover valve handle 147 and is placed thereon to complete the cover assembly.

Therefore, as shown in FIG. 5, the present invention may be easily and quickly installed so that, when fully assembled, it provides an aesthetically pleasing cover for undersink piping which completely covers and insulates the undersink drain piping and water supply piping. The present invention may be manufactured utilizing Vinyl Plastisol from Plastomeric of New Baltimore, Ohio which provides adequate insulation and cushioning to prevent burns or abrasions from contact with the pipes but allows flexing of the flexible collars. The material used to manufacture the cover pieces may be injected into a die corresponding to a particular piece when in a flowing state and then allowed to harden to a set form. Accordingly, other materials might be utilized without deviating from the scope of the invention.

The insulative cover embodiments of the present invention have minimal, exposed cavities for trapping dirt or other bacteria. Preferably, the flexible collars of the one embodiment of the present invention are utilized so that when fully assembled, the cover assembly includes a series of downwardly turned overlap collars which prevent dirt and bacteria from settling by gravity at the pipe junctures. The insulative cover of the present invention are simple to install, requiring very few tools, very little time and little or no external fasteners.

The flexible collars and other collar structures in combination with the various cover pieces allow quick and easy assembly and use of the invention by exposing pipe junctures and pipe nuts for further manipulation during assembly of a P-trap drain and application of the invention. Furthermore, since the various collar structures may be moved away from the junctures to expose the pipe junctures, the various cover pieces may be first placed on their respective pipe sections and the pipe sections assembled into a complete P-trap. This amounts to a substantial savings in time when using the invention and assembling a P-trap drain. Additionally, since the various collar structures allow individual cover pieces of the invention to be applied to the respective pipe sections prior to assembly of the P-trap, the cover sections require little or no additional securement to the pipe sections after installation.

For example, in one embodiment of the invention, the L-shaped and straight cover pieces 70, 82 are essentially whole, unslit, tubular pieces which, because of their flexible collars, may be slid over the straight and L-shaped pipe sections 88, 72 prior to assembly of the P-trap. Once installed and the collars folded down, the straight and L-shaped cover pieces 70, 82 completely cover their respective pipe sections 88, 72 and are secure thereon without need for additional securing mechanisms. Furthermore, when the J-shaped cover piece 108 is slit partially there along from both ends and generally through the flexible collars, there might be a tendency for the J-shaped cover piece to be loose. However, with the present invention, once the P-trap has been assembled and all of the cover pieces of the present invention installed with the flexible collars rolled down to cover the pipe nuts and pipe junctures, the overlapping collars from the straight and L-shaped pieces cover the collars on the J-shaped piece and portions of the slit J-shaped piece to hold the J-shaped cover apiece in place and the collars of the J-shaped piece securely wrapped around the pipe section.

While the present invention has been illustrated by the description of the embodiments thereof, and while the embodiments have been described in considerable detail, it is not the intention of applicant to restrict or in any way limit the scope of the appended claims to such detail. Additional advantages and modifications will readily appear to those skilled in the art. For example, the slidable and wrappable collars of the present invention may have different shapes than the collar structures disclosed herein. Furthermore, the slidable and wrappable collars may be removably fixed to the respective cover pieces to be severed or detached from those pieces and placed around the pipe junctures. Therefore, the invention in its broader aspects is not limited to the specific details, representative apparatus and method, and illustrative examples shown and described. Accordingly, departures may be made from such details without departure from the spirit or scope of applicant's general inventive concept.

What is claimed is:

1. An insulative cover piece for insulating the J-shaped piping section of a P-tray drain pipe assembly which pipe section includes a drain opening sealed with a closure plug, the cover comprising:

first and second straight portions and a curved portion extending between said straight portions, the curved portion having an outermost point which is proximate said pipe section drain opening and closure plug;

an aperture formed in the curved portion proximate the outermost point, the aperture defining an opening such that said drain opening may be accessed by removing said closure plug through the aperture;

a protective structure extending from said curved portion proximate said aperture, the protective structure being operable to cover a portion of said drain opening and closure plug to insulate said drain opening and plug.

2. An insulative cover piece as in claim 1 wherein said protective structure further comprises a hollow projection extending from the curved portion proximate the outermost point and coupled to said aperture at one end thereof.

3. An insulative cover piece as in claim 2 further comprising a flap coupled to the projection proximate an opening of the projection, the flap movable to open and close the opening such that the projection completely covers said closure plug.

4. An insulative cover piece as in claim 2 further comprising a removable cap configured to fit over the projection opening to open and close the opening such that the projection completely covers said closure plug.

5. An insulative cover piece as in claim 2 further comprising a removable cover plug configured to fit inside the projection opening to open and close the opening such that the projection completely covers said closure plug.

6. An insulative cover piece as in claim 2 wherein the projection includes a flexible section which may be rolled back to expose said drain opening and closure plug.

* * * * *